United States Patent [19]

Ketcham

[11] Patent Number: 5,641,320

[45] Date of Patent: Jun. 24, 1997

[54] CONTINUOUSLY VARIABLE TRACTION TRANSMISSION

[76] Inventor: George Ketcham, 350 Wilson Rd., Easton, Conn. 06612

[21] Appl. No.: 635,303

[22] Filed: Apr. 19, 1996

[51] Int. Cl.⁶ .................................................. F16H 15/44
[52] U.S. Cl. .................................................. 476/55; 476/1
[58] Field of Search ............................................. 476/1, 55

[56]  References Cited

U.S. PATENT DOCUMENTS

| Re. 10,968 | 11/1888 | Hoffman | 476/55 |
|---|---|---|---|
| 472,223 | 4/1892 | Osborn . | |
| 958,694 | 5/1910 | Cox | 476/55 |
| 1,001,354 | 8/1911 | Chapman . | |
| 1,425,172 | 8/1922 | Cameron-Cowburn . | |
| 1,770,408 | 7/1930 | Jacobsen . | |
| 2,209,497 | 7/1940 | Winger et al. . | |
| 2,255,200 | 9/1941 | Wahl . | |
| 2,359,540 | 10/1944 | Bade . | |
| 2,578,801 | 12/1951 | Harshberger . | |
| 3,433,099 | 3/1969 | Nasvytis . | |
| 3,793,910 | 2/1974 | Nasvytis . | |
| 4,098,145 | 7/1978 | Dickinson . | |
| 4,196,638 | 4/1980 | Lyons, Jr. . | |
| 4,428,246 | 1/1984 | Horton et al. . | |
| 4,592,246 | 6/1986 | Hofmann . | |
| 4,771,838 | 9/1988 | Ketcham . | |
| 4,850,235 | 7/1989 | Burke . | |
| 4,952,201 | 8/1990 | Winsko et al. . | |
| 4,987,789 | 1/1991 | Rohs et al. . | |
| 5,020,384 | 6/1991 | Kraus . | |
| 5,330,020 | 7/1994 | Ketcham . | |

FOREIGN PATENT DOCUMENTS

| 560276 | 9/1932 | Germany . | |
|---|---|---|---|
| 2219879 | 10/1973 | Germany . | |
| 71641 | 11/1948 | Norway | 476/55 |
| 813039 | 3/1981 | Russian Federation | 476/55 |
| 281942 | 12/1927 | United Kingdom . | |

*Primary Examiner*—Allan D. Herrmann
*Attorney, Agent, or Firm*—DeLio & Peterson, LLC

[57] ABSTRACT

A continuously variable traction transmission uses a pair of rotatable, substantially cone shaped members, one cone being connected to a power input shaft and the other cone being connected to the load output shaft. The small diameter of one cone is oriented adjacent the large diameter end of the other cone. The cone surfaces are configured such that the cones may make contact at a point or small area, for example, as seen longitudinally, the surface of one cone may be slightly convex and the surface of the other cone may be straight. The shafts on which the cones rotate are angularly adjustable with respect to each other such that the point of contact, and therefore the ratio of diameters of the cones, may be varied from one end of the cones to the other to continuously vary the input/output ratio of speed and torque transmitted through the transmission. Control systems for the transmission permit automatic or external manual control over the starting input/output ratio and over adjustment of the input/output ratio during operation.

19 Claims, 5 Drawing Sheets

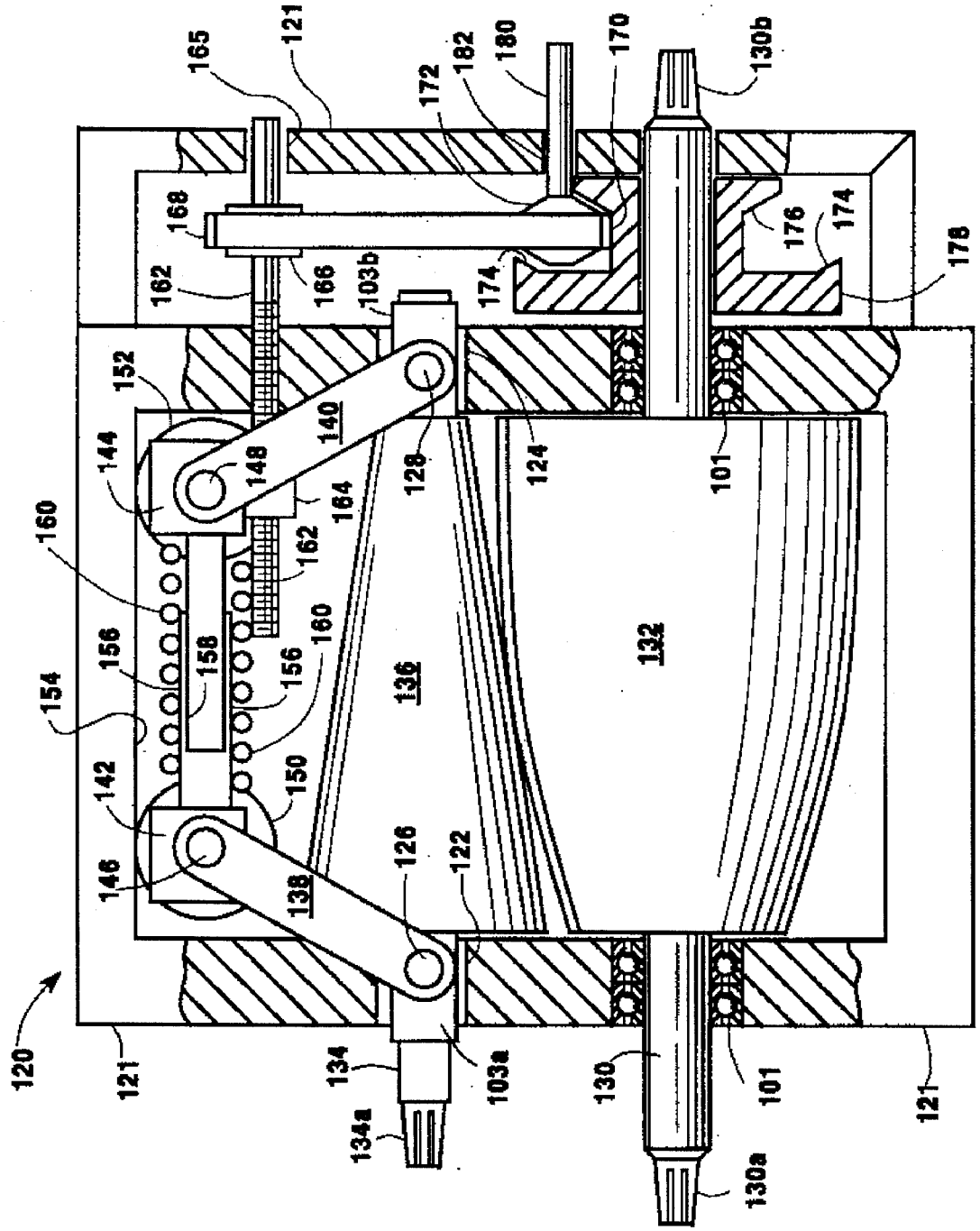

CONTINUOUSLY VARIABLE TRACTION TRANSMISSION

BACKGROUND OF THE INVENTION

A related application by the same inventor has been filed on even date herewith as U.S. Ser. No. (Docket No. EST 10200).

1. Field of the Invention

This invention relates to power transmissions for powered vehicles, such a automobiles and bicycles, and for machinery in general. In particular, the invention relates to a transmission in which input torque and speed may be varied continuously to provide a desired range of output torque and speed, and is not limited to any preselected gear ratios.

2. Description of Related Art

It is desirable to be able to vary an input to output shaft ratio smoothly and continuously over an infinite range of ratios as opposed to the discrete step change associated with gear changers. Prior art systems have attempted to replace discrete gears transmissions having fixed input/output ratios by various friction drive arrangements. Some of these systems have utilized rotatable conical surfaces to adjust input/output ratios. An early system is disclosed in U.S. Pat. No. 1,001,354 in which an adjustable belt was moved along the surface of rotatable cones to vary the output torque and speed, based on a given input. U.S. Pat. No. 3,793,910 discloses a complex, variable speed planetary drive system. The system includes a series of conical members in which movement is transmitted to ring and disk members which are positionable at various positions along the conical surface to change the speed ratio. U.S. Pat. No. 3,433,099 discloses a friction drive system having an adjustable axially split frusto-conical member. Another U.S. Pat. No. 5,020,384, utilizes various combinations of concave and/or convex surfaces to transmit torque across the friction boundaries of those surfaces. However, in all of them, at least one friction boundary in the chain of boundaries is required to slip while transmitting torque in order to effect a ratio change of input to output shafts. The force therefore to change the ratio relationship must be greater than the force of torque transmission. None of these systems utilize direct contact between all members which is adjustable in a slipless manner.

Other transmission systems are disclosed in U.S. Pat. Nos. 472,223, 1,425,172, 1,770,408, 2,209,497, 2,255,200, 2,359,540, 2,578,801, 4,098,145, 4,196,638, 4,428,246, 4,592,246, 4,850,235, 4,952,201, and 4,987,789. Disclosures in foreign patents include GB 281,942, DE 560,276 and DE 2,219,879.

Because of the excessive force required to slip moving, power transmitting surfaces across each other, traction and other drive transmission systems must be quite complex in order to provide continuous and infinite input/output ratios. A further problem with most continuously variable traction transmissions is the high level of complexity in the torque transmission paths and also in control actuation. A particular problem with those traction transmissions that utilize multiple torque paths is that, in the process of varying the input/output ratio, all paths must be absolutely identical in size, otherwise one path will try to cause a greater output than the other parts and slippage will be induced, the torque for which must come from the prime power source through the non-slipping path. There is nothing in these prior art systems which transmits torque across a friction boundary in a slipless and stepless manner in response to a simple linear control motion. Further, prior art transmissions generally require a separate input to change the input/out ratio.

Bearing in mind the problems and deficiencies of the prior art, it is therefore an object of the present invention to provide a traction transmission for continuously and infinitely varying input/output ratios of torque and speed.

It is another object of the present invention to provide a transmission for continuously varying the rotational relationship between an input shaft and an output shaft of a traction transmission by simple low force motion of a control element of the transmission which may be actuated internally or externally to the transmission.

A further object of the invention is to provide a transmission in which the rotational relationship of the members is rapidly actuatable throughout the entire range simultaneously with the transmission of the full torque permitted by the friction interfaces.

It is yet another object of the present invention to provide a transmission in which the input/output ratio is automatically changed by the transmission as a function of required output torque.

It is yet a further object of the present invention to provide a transmission in which the input/output ratio is automatically changed by the transmission as a function of required output torque, and whereby this torque function is adjustable externally to the transmission.

It is another object of the present invention to provide a transmission in which the input/output ratio may be changed manually external to the transmission.

Still other objects and advantages of the invention will in part be obvious and will in part be apparent from the specification.

SUMMARY OF THE INVENTION

The above and other objects and advantages, which will be apparent to those skilled in the art, are achieved in the present invention which is directed to, in a first aspect an apparatus for providing a variable torque or speed output in response to a given torque input. The apparatus includes a rotatable input shaft and a driving member connected to the input shaft. The driving member is rotatable about a longitudinal axis and having a diameter near a first end greater than the diameter near a second end and an outer surface between the first and second diameters. Also provided is a driven member rotatable about a longitudinal axis and having a diameter near a first end greater than the diameter near a second end and an outer surface. The outer surfaces of the driving member and the driven members have configurations, and the members having a relative orientation, such that the outer surface of the driving member contacts the outer surface of the driven member along a distance less than the distance between the first and second diameters of the members during rotation to permit transmission of torque therebetween. The longitudinal axes of the members are adjustable relative to one another such that the location of contact between the outer surfaces of the driving and driven members may be varied longitudinally between their first and second diameters. A rotatable output shaft is connected to the driven member. Upon input of one rotational torque of the input shaft, rotational torque of the output shaft may be varied by relative adjustment of orientation of the driving and driven members to move longitudinally the location of contact between the members.

Preferably, the longitudinal axes of the members are relatively angularly adjustable and the first diameter of the driving member is oriented near the second diameter of the driven member and the second diameter of the driving member is oriented near the first diameter of the driven member. In the preferred embodiment, the outer surface of each of the members is smooth between the first and second diameters and the apparatus is operable to continuously vary the rotational torque of the output shaft. Also, the outer surface of both of the members, between the first and second diameter, is convex in longitudinal cross section.

In one embodiment of the invention, the outer surface of one of the members, between the first and second diameter, is convex in longitudinal cross section and the outer surface of the other of the members, between the first and second diameter, is flat in longitudinal cross section. In another embodiment of the invention, the outer surface of one of the members, between the first and second diameter, is convex in longitudinal cross section and the outer surface of the other of the members, between the first and second diameter, is concave in longitudinal cross section.

Repositioning of the driving or driven members may be with respect to the input or output shafts. For example, the driving member may be connected to the input shaft by a flexible joint and the longitudinal axis of the driving member is movable to a position non-parallel with a longitudinal axis of the input shaft. In another example, the driven member is connected to the output shaft by a flexible joint and the longitudinal axis of the driven member is movable to a position non-parallel with a longitudinal axis of the output shaft.

At least one of the driving and driven members is preferably substantially conical and, more preferably, both of the driving and driven members are substantially conical.

In another aspect, the invention relates to a method of varying torque output in response to a given torque input in a power transmission. In connection with the transmission described above, the method comprises initially positioning the driving and the driven members such that the members contact each other along their outer surfaces at a first location on the driving member and a first location on the driven member between the first and second diameters of the members. Then, rotational torque is applied to the input shaft and the torque is transmitted through the driving member to the driven member and the output shaft to achieve a first torque output. Subsequently, the method includes adjusting the orientation of the driving member relative to the driven member and repositioning contact between the members such that the members contact each other at second locations on their outer surfaces, longitudinally different from the first locations, to achieve a second torque output at the output shaft, different from the first torque output. In the preferred embodiment, orientation of the members is by changing the relative angular position of the driving member relative to the driven member.

In one embodiment, the driving member is connected to the input shaft by a flexible joint and includes moving the longitudinal axis of the driving member to a position non-parallel with the longitudinal axis of the input shaft. In another embodiment, the driven member is connected to the output shaft by a flexible joint and includes moving the longitudinal axis of the driven member to a position non-parallel with the longitudinal axis of the output shaft.

In yet another aspect, the invention provides an apparatus for continuously varying the rotational speed of a drive comprising a rotatable input shaft, a rotatable output shaft and variable transmission members in driving connection with the input and output shafts. The variable transmission members are in tangential contact with each other along their surfaces for transmission of rotational motion from the input shaft to the output shaft. The torque of the output shaft is variable with respect to a given torque of the input shaft over a preselected range by relative orientation of the variable transmission members with respect to each other. The apparatus also includes positioning apparatus initially orienting the transmission members in a first relative position such that the speed of the output shaft is at the higher end of the preselected range relative to the speed of the input shaft. The positioning apparatus is responsive to motion of the input shaft to orient the transmission members relative to each other to a second position of lower output shaft speed in the preselected range and, whereby, upon orientation to the second position, rotation of the output shaft commences.

In a preferred configuration, the transmission members are of opposed substantially conical configuration such that a smaller diameter of one of the transmission members is aligned with a larger diameter of another of the transmission members and a larger diameter of the one of the transmission members is aligned with a smaller diameter of the other of the transmission members. At least one of the substantially conical transmission members should have an outer surface, between the smaller and larger diameter, which is curved in longitudinal cross section. The positioning apparatus may comprise a cam rotatably supporting at least one end of one of the substantially conical transmission members, such that the cam is rotatable along a surface to orient the transmission members between the first position and the second position. The positioning apparatus may further include a spring for urging the cam and transmission members into the first position. Also, the positioning apparatus further includes means for adjusting tension of the spring and means for adjusting the position of the cam.

In a further aspect, the invention provides an apparatus for continuously varying the rotational speed and torque of a drive comprising a rotatable input shaft; a rotatable output shaft; and variable transmission members in driving connection with the input and output shafts and in tangential contact with each other along their surfaces for transmission of rotational motion from the input shaft to the output shaft. The torque of the output shaft is variable with respect to a given torque of the input shaft over a preselected range by relative orientation of the variable transmission members with respect to each other. Also provided is means for initially orienting the transmission members in a relative position for commencing rotation of the output shaft upon a predetermined input torque, the orienting means being adjustable to change the predetermined input torque at which rotation of the output shaft commences.

The orienting means may include a spring having a tension adjustment for initially orienting the transmission members in the relative position for commencing rotation of the output shaft upon the predetermined input torque and, optionally, an externally adjustable lead screw for adjusting the tension of the spring. The apparatus may include a gear movable in a first direction to rotate the lead screw in a first direction, and a gear movable in a second direction to rotate the lead screw in a second direction, the gear having a neutral position imparting no rotation to the lead screw.

Alternatively, a lead screw may be provided for adjusting the orientation of at least one of the transmission members relative to the other of the transmission members. Also provided may be a gear movable in a first direction to rotate the lead screw in a first direction and movable in a second direction to rotate the lead screw in a second direction, the gear having a neutral position imparting no rotation to the lead screw.

The apparatus may include a pair of arms, each arm having a first end secured to an end of one of the transmission members and a second end movable relative to a surface, the arms urging the one of the transmission members against the other of the transmission members with a force sufficient to transmit torque between the transmission members. Optionally, means such as a spring urge the second ends of the arms apart. Means may be included for moving the second ends of the arms relative to the surface to change the relative orientation of the variable transmission members with respect to each other.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 7 is a side elevational view of another embodiment of the transmission of the present invention.

DESCRIPTION OF THE PREFERRED EMBODIMENT(S)

Figure 1:
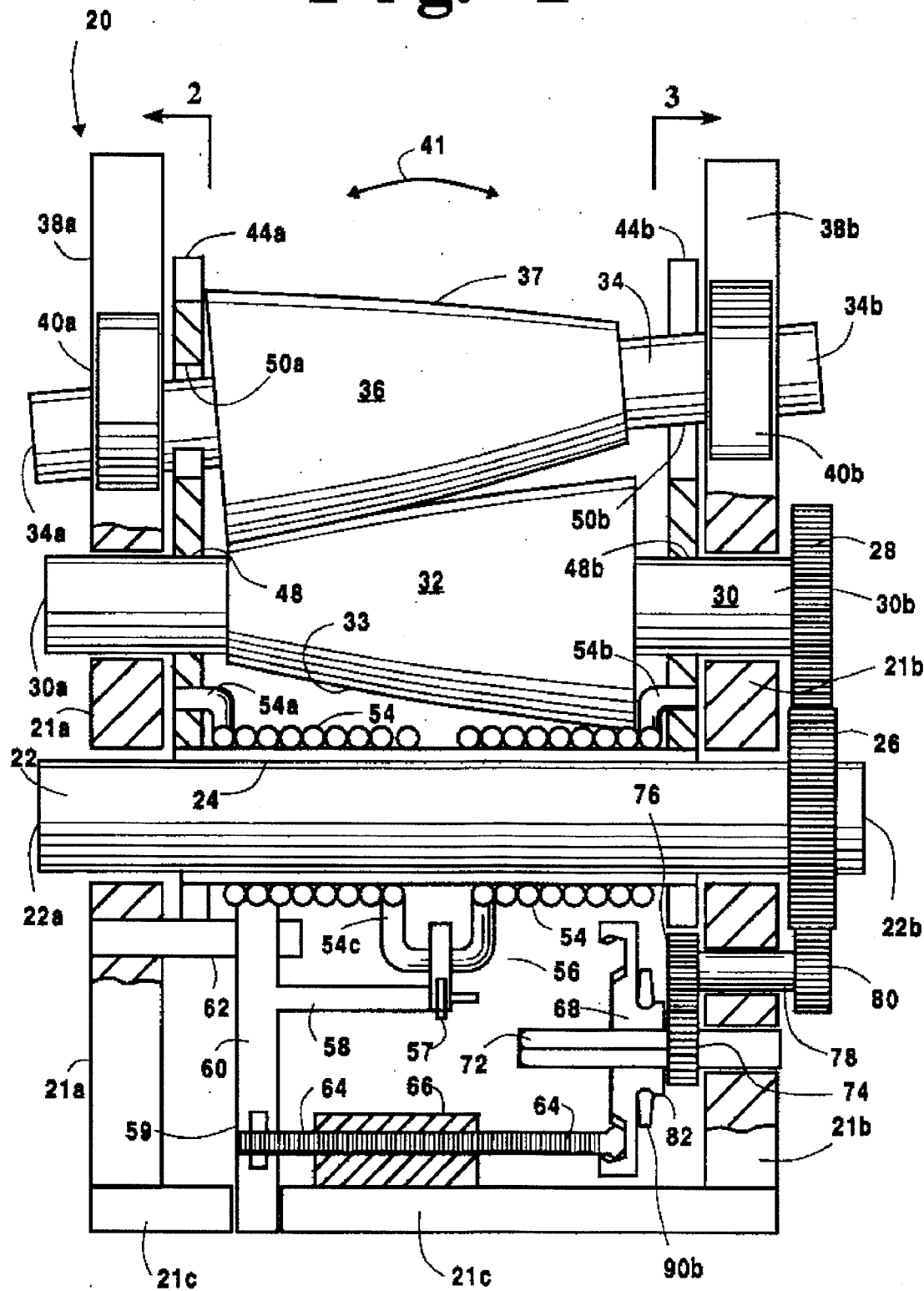
FIG. 1 is a side elevational view showing the principal working components of a preferred embodiment of the invention which fulfills all of the objectives above.

In describing the preferred embodiment of the present invention, reference will be made herein to FIGS. 1-7 of the drawings in which like numerals refer to like features of the invention. Features of the invention are not necessarily shown to scale in the drawings.

The traction torque transmission as depicted by FIGS. 1-7 may be utilized in various types of power transmission applications, for example automobile, truck or motor driven machinery, where it is necessary or desirable to change the output torque or speed of a given input. The present invention here may have particular application for non-motor driven machinery, in particular, bicycles, which are driven by the rider's feet pushing against a pair of cranks. Preferably, the transmission components depicted herein are made of steel or some other hard and strong metal or alloy, unless otherwise described.

As shown in FIGS. 1-6, a bicycle transmission 20 has input shaft 22 rotatable within tube 24 connecting rotator plates 44a, 44b disposed between frame members 21a and 21b. Fixedly securable to the ends 22a, 22b of input shaft 22 are bicycle foot pedals (not shown) which provide the motive power for rotating shaft 22 within tube 24. The entire transmission 20 depicted in the figures is sized to fit on a bicycle frame between the pedals. Gear 26 attached to shaft 22 near end 22b is operatively meshed with gear 28 attached to shaft 30. Shaft 30 is rotatably secured between frame members 21a, 21b and has fixedly disposed on it transmission driving member 32. Alternatively, input shaft 22 may be omitted and input power may be supplied directly into shaft 30. Driving member 32 is generally cone shaped, with a relatively small diameter at one end (left as shown in FIG. 1) and a relatively large diameter at the opposite end (right as shown on FIG. 1). The outer surface 33 of driving member or cone 32 has a convex configuration, i.e., an outwardly bowing line portion between the smaller and larger diameters, as seen in longitudinal cross-section.

Mounted between frame members 21a and 21b adjacent and above cone 32 is driven member or cone 36 fixed on shaft 34. Driven cone 36 and shaft 34 may be connected to a load (not shown) which, in the bicycle example depicted, is a chain operatively connected to the rear wheel of the bicycle. Ends 34a, 34b of shaft 34 are rotatably mounted in cams 40a, 40b, respectively, which are themselves respectively rotatable within frame members 38a, 38b. The longitudinal axis of shaft 34 is angularly adjustable relative to the longitudinal axis of shaft 30. Like cone 32, the outer surface 37 of cone 36 is shown having a convex configuration. Cones 32 and 36 are juxtaposed such that the smaller end of cone 32 is adjacent the larger end of cone 36 at one (left) side of the frame while the larger end of cone 32 is adjacent the smaller end of cone 36 at the other (right) side of the frame. Both cones 32 and 36 are circular in axial cross-section, and the cones are urged against each other and in contact along their respective outer surfaces near the small (left) end of driving cone 32 and the larger (left) diameter of driven cone 36. FIG. 1 shows the cone 32 in rotational contact with cone 36 at the highest torque ratio ($T_{output}/T_{input}$) and the lowest speed ratio ($S_{output}/S_{input}$). Because of the elastic deflection of the materials of the cones, the area of contact between cones 32 and 36 is more than point contact, but is still considerably less than the distance between the ends of the cones. Since a large area of contact will produce friction (and heat) due to a slight amount of slippage at the lateral edges of the contact area, the cones are preferably made of hardened, heat treated steel so that elastic deflection of the material is minimized.

The contact area forms a friction boundary through which torque and rotational motion is transmitted from the driving cone to the driven cone. The friction boundary resists slipping motion between the two cones for forces below the product of the coefficient of friction of the cone surfaces and the force pressing the cones together. In this embodiment, the force pressing the cones together is established by the force exerted by frame end plates 38a, 38b on shaft 34. For conical angles below the critical angle of an object on an inclined plane, no axial slippage will occur, and for torque values below friction value, no radial slippage will occur.

Figure 2:
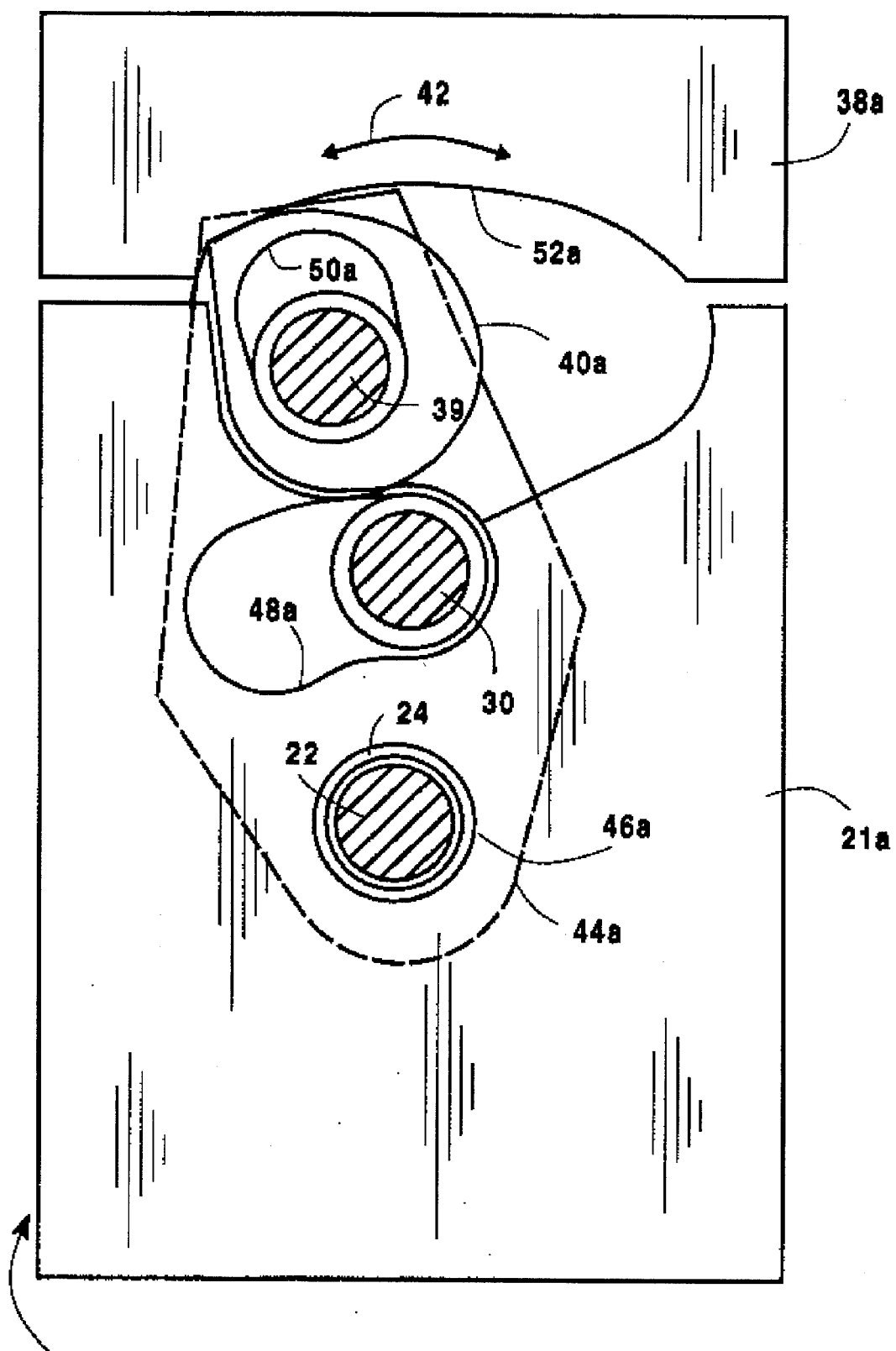
FIGS. 2 and 3 are end elevational views of the left and right sides of the embodiment of FIG. 1 as seen from a view point inside the view of FIG. 1.

Both cones 32 and 36 rotate about their respective longitudinal axes. Additionally, cone 36 rotates with respect to cone 32 in the direction shown by arrow 41 as the angle between shafts 30 and 34 changes and as surfaces 33 and 37 make contact at different points (areas) along their surfaces from one end of the cones to the opposite end of the cones. In order to effect rotation in direction 41 between cones 32 and 36, the axis of cone 36 (shaft 34) is also rotatable with respect to the axis of cone 32 (shaft 30) in the direction shown by arrow 42, as seen in end views in FIGS. 2 and 3. Relative rotation of cone 32 in direction 42 is effected by rotational movement of rotator plates 44a and 44b, which are disposed on the left and right, respectively, of the cones as seen in FIG. 1. As shown in FIG. 2, rotator 44a has circular opening 46a which receives input shaft 22 and which forms the axis about which it rotates in direction 42.

Curved slot 48a in rotator 44a rototably receives driving cone shaft 30 and slot 50a rotator 44a rotatably receives driven cone shaft 34. Slot 48a is laterally slideable relative to shaft 30, but imparts no movement to shaft end 34a. Slot 50a is vertically slideable relative to shaft 34, and imparts right and left movement to shaft end 34a as seen in FIG. 2. Rotator 44b has openings 48b and 50b which rotatably receive shafts 30 and 34, respectively. Slot 48b is laterally slideable relative to shaft 34, but imparts no movement to shaft end 34b. Slot 50b is vertically slideable relative to shaft 34, and imparts right and left movement to shaft end 34b during rotation in direction 42.

Figure 3:
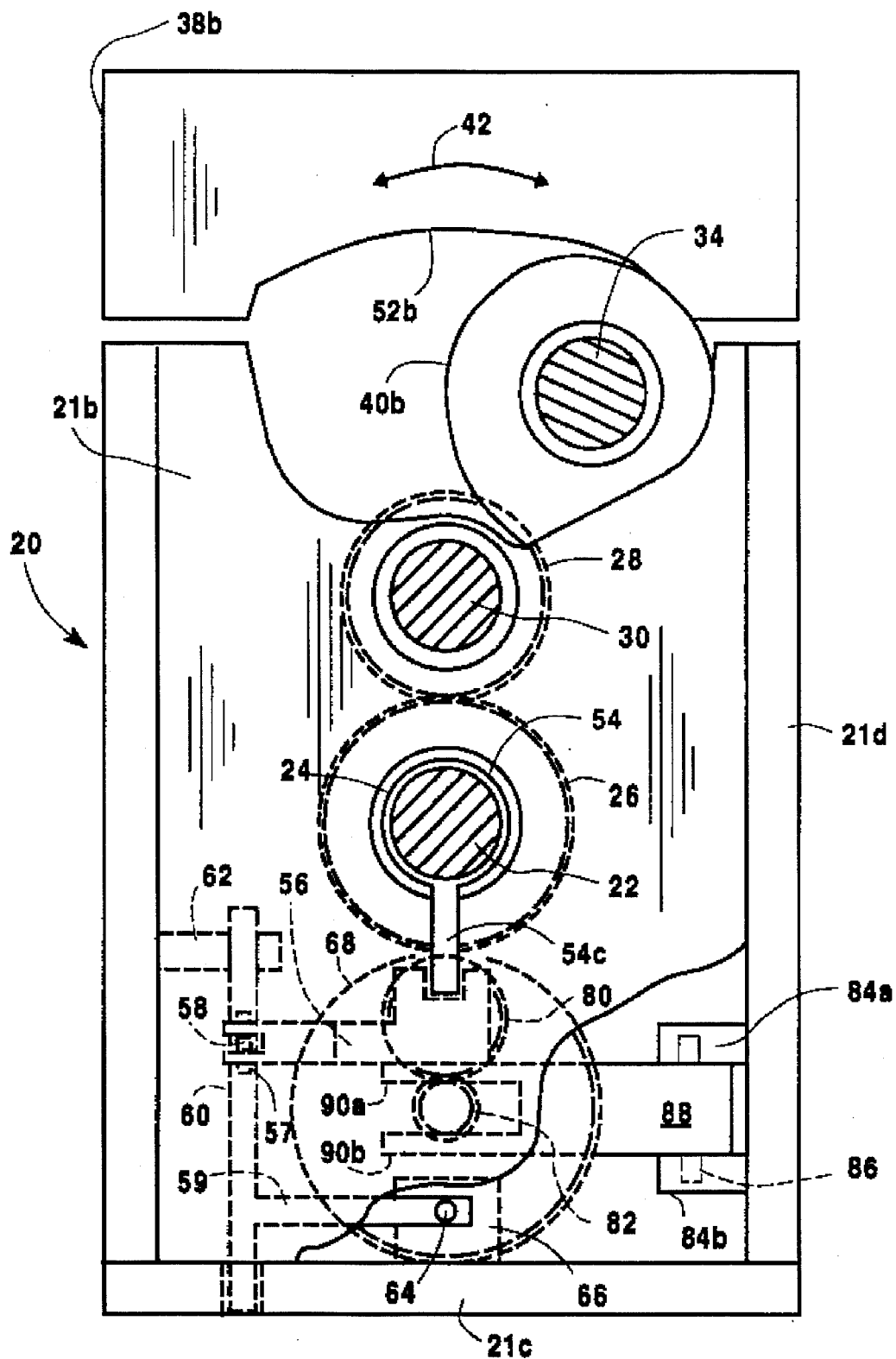
Figure 4:
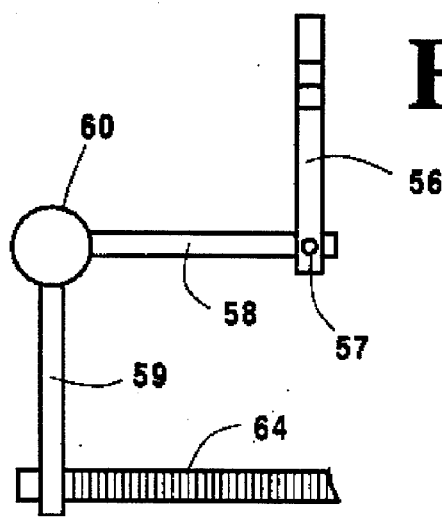
FIG. 4 is a top view from a point inside FIG. 1 looking down upon the portion of the transmission of the present invention that controls the adjustment of the starting input/output ratio.

In order to effect maximum change in the torque ratio and speed ratio of transmission 20, driven cone 36 must be rotated in direction 41 (FIG. 1) from an initial contact (i) with driving cone 32 at the left end (small diameter of cone 32 and large diameter of cone 36) which has the highest torque ratio and lowest speed ratio to a subsequent contact (ii) with driving cone 36 at the right end (large diameter of cone 32 and small diameter of cone 36) which has the lowest torque ratio and highest speed ratio. Contact at a point (area) is maintained between cones 32, 36 with sufficient force to preclude slippage by the simultaneous movement of the ends of the shafts on which the cones are disposed. At initial contact (i), driving shaft end 30a should be closest to driven shaft end 34a and driving shaft end 30b should be furthest from driven shaft end 34b. At subsequent contact (ii), driving shaft end 30a should be furthest from driven shaft end 34a and driving shaft end 30b should be closest to driven shaft end 34b. Relative movement of the shaft ends and maintenance of cone contact force between contacts (i) and (ii) is effected by cams 40a and 40b, which are rotatably mounted on bearings on driven shaft 34 near ends 34a and 34b, respectively. As shown in FIG. 2, cam 40a on shaft 34 contacts cam surface 52a on end plate 38. As rotator 44a rotates about input shaft 22, end 30a of shaft 30 remains laterally stationary with respect to frame member 21a while end 34a of shaft 34 is simultaneously moved laterally by slot 50a and vertically by cam 40a. At the same time, as seen in FIG. 3, rotator 44b rotates about input shaft 22, shaft end 30b remains laterally stationary with respect to frame member 21b while shaft end 34b is simultaneously moved laterally by slot 50b and vertically by cam 40b contacting cam surface 52b on end plate 38b. As will be appreciated by one skilled in the art, cams 40a and 40b and respective cam surfaces 52a and 52b must be designed in accordance with the size and outer surface configuration of cones 32 and 36 so as to maintain sufficient contact friction between the cones during movement from position (i) to position (ii). Thus, cone 36 simultaneously rotates in both directions 41 and 42 as the point (area) of contact between cones 32 and 36 is maintained as contact moves from one end of the cones to the other. As such contact changes, the torque and speed ratio will change as the relative diameters of the driving and driven cones change at the point of contact.

In order to set the position of rotator plates 44a and 44b relative to frame members 21a, 21b, there is provided a spring 54 which has end portions 54a, 54b secured to rotators 44a, 44b, respectively, and central portion 54c is connected to spring tensioner 56. Spring 54 is configured to impart a force on rotator plates 44a, 44b to drive cones 32, 36 into contact position (i), the lowest torque ratio and highest speed ratio.

In operation, as an initial amount of torque is applied to input shaft 22 (clockwise in FIG. 3), driving cone 32 is rotated counterclockwise as a consequence of operation of gears 26 and 28. While the load torque on cone 36 restrains it from rotation about its axis (shaft 34) driven cone 36 will be dragged and rotated in directions 41 and 42, along with driving cone 32, against the force of spring 54 imparted through rotator plates 44a, 44b. As shaft ends 34a, 34b of cone 36 move against the restraining tension of spring 54, cams 40a and 40b will roll against cam surfaces 52a and 52b, respectively, so that the radii of cams 40a, 40b progressively increase and decrease, respectively. This movement then causes shaft ends 30a and 34a to move toward each other and shaft ends 30b and 34b to move away from each other, thus causing cone 36 to rotate in direction 41 rolling across the surface of cone 32 and moving the cone contact point so that the torque ratio progressively increases and the speed ratio progressively decreases. When the input torque on the driving cone, as supplied by input shaft 22, equals the load torque on driven cone, driven cone 36 will commence rotation about its longitudinal axis (shaft 30) and supply output rotation to the load, and further motion in direction 42 will cease. Because cone 36 rotates in directions 41 and 42 during operation, a flexible coupling (not shown) such as a flexible shaft, universal joint or other well know coupling means will be necessary for end 34a to communicate with a fixed load shaft.

The transmission of the present invention also adjusts torque and speed ratios automatically. Because spring 54 is constantly urging the cones into a high speed ratio, low torque ratio relationship, as load torque decreases, cone 36 will be rotated in directions 41 and 42 by spring 54 into a position of lower torque ratio, higher speed ratio. On a bicycle, such load torque will typically decrease initially as the bicycle and rider overcome the high initial starting torque load on the wheel and achieve a steady state speed. Should the bicycle and rider encounter a higher torque load during cruising, for example, when starting to pedal up hill, driven cone 36 will again be dragged and rotated in directions 41 and 42 to a new position of equilibrium with cone 32 so that the contact point between the cones corresponds to a higher torque ratio and lower speed ratio. Speed and torque ratios will continue to be automatically adjusted as the bicycle and rider encounter different torque loads and conditions throughout the ride.

The present invention also contemplates adjustment of the setting of the relationship between motions 41, 42 and the torque at which rotation of cone 36 about shaft 34 commences. As depicted in FIG. 3, spring tensioner 56 is slideably adjustable for lateral linear movement. The position of tensioner 56 will determine the tension in spring 54 and the force applied to rotators 44a, 44b, and therefore the equilibrium starting torque of the transmission. Tensioner 56 is connected by pin 57 to arm 58. Movement of tensioner 56, which captures spring end 54c between an upward facing fork, is effected by movement of upper arm 58 of actuator 60 rotatably secured at an upper end to bearing block 62 (attached to frame 21a) and at the lower end to base frame 21c. Actuator 60 also includes lower arm 59 fixedly secured thereto. Actuator 60 and arm 58 are rotated by movement of lead screw 64 against lower arm 59. Lead screw 64 is threaded into block 66 mounted on base plate 21c. Thus, rotation of lead screw 64 will effectively adjust the position of tensioner 56 and the initial starting and equilibrium torque of the transmission.

Figure 5:
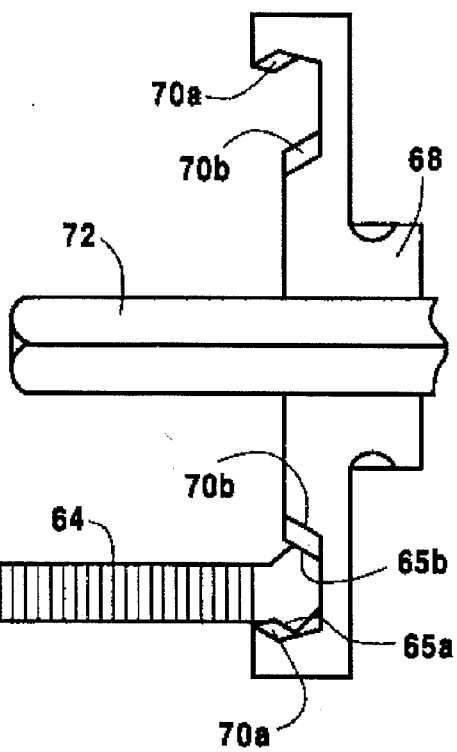
FIG. 5 is an enlargement of the starting torque adjustment portion of the transmission depicted in FIGS. 1-3.

For automatic adjustment of the tensioner, the present invention provides a servo gear 68 which is adapted to rotate lead screw 64 in either direction to move the tensioner to a higher or lower starting (equilibrium) torque. As shown in FIG. 5, gear teeth 70a, 70b of servo gear 68 clear lead screw mating teeth 65a, 65b, respectively, when the end of lead screw 64 is centered so that servo gear can rotate in a neutral position without turning the lead screw. Servo gear 68 is slideably mounted on hexagonal shaft 72 which is adapted to rotate gear 68. Gear 74 is mounted on hex shaft 72 and is driven by gear 76 mounted on shaft 78. Gear 80, mounted on the opposite end of shaft 78, engages input shaft gear 26 and is driven thereby. Servo gear 68 is thus rotatably driven by input shaft 22.

Turning to FIG. 3, lever 88 rotates on a pin 86 through bearing blocks 84a, 84b secured to side frame member 21d. Lever 88 is actuated by means (not shown) external to transmission 20, such as a push-pull cable attached to a lever on the bicycle frame. Lever 88 communicates with servo gear 68 by a yoke portion having upper and lower arms 90a, 90b, which slideably engage grooves in a flange 82 on the servo gear, so that movement of lever 88 causes servo gear 68 to move axially along hex shaft 72. As servo gear is moved to the left as shown in FIGS. 1 and 5, teeth 70a on the servo gear engage with teeth 65a on lead screw 64, thereby causing lead screw to turn in block 66 and move leftward. When motion of servo gear 68 to the left stops, lead screw 64 continues to rotate until its motion to the left disengages lead screw teeth 65a, at which point lead screw 64 ceases rotation. Similarly, movement of lever 88 to the right moves servo gear in the same direction so that servo gear teeth 70b engage lead screw teeth 65b and cause rotation and movement of the lead screw to the right, until lever 88 ceases movement. In this manner tensioner 56 will adjust position in accordance with the position of lever 88. As discussed previously, spring 54 tension adjusts the torque at which load torque balances tensioner torque, and at which driven cone 36 commences rotation about shaft 34. Thus, lever 88 position controls starting torque of transmission 20.

In an alternate embodiment, tensioner 56 is controlled by a simple locking screw to pre-set its location. In another embodiment, the tensioner and actuating mechanism is retained, but spring 54 is removed. A tang connected to and extending from rotator tube 24 communicates with tensioner 56 replacing central portion 54c of spring 54. In this latter embodiment adjustment of torque and speed ratio is under external manual control.

Figure 6:
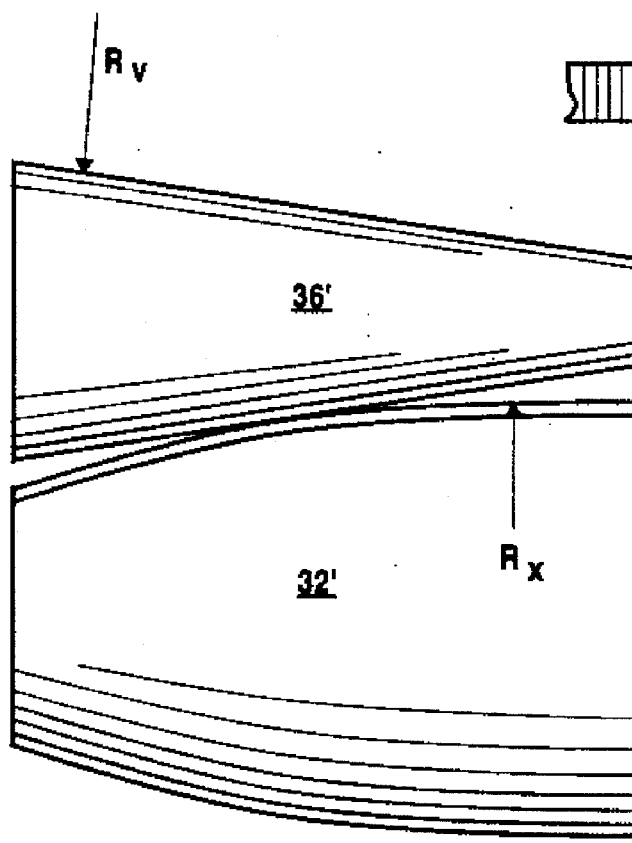
FIG. 6 is a side elevational view of another embodiment of the drive and driven cone members which may be employed in the transmission of the present invention.

In the main embodiment discussed above, both cones are of convex configuration. Alternatively, one of cones 32 or 36 may have an outer configuration with a convex configuration and the other of cones 32 or 36 may have a straight configuration (a straight line portion between the smaller and larger diameters, as seen in longitudinal cross-section) or a concave configuration (an inwardly bowing line portion between the smaller and larger diameters, as seen in longitudinal cross-section). Where one of cones 32 or 36 has a concave configuration, the radius of curvature of the concave cone must be larger than the radius of curvature of the other, convex, cone so that contact between the cones occurs only at one portion of the surface less than the distance between the two ends of the cones. A convex-concave cone configuration is depicted in FIG. 6 wherein driving cone 32' has a convex outer surface with a radius of curvature $R_x$ and driven cone 36' has a concave outer surface with a radius of curvature $R_y$, with $R_y$ being greater than $R_x$.

An alternate transmission embodiment 120 having a convex driving cone 132 and a straight driven cone 136 is depicted in FIG. 7. Driving member or cone 132 is disposed on shaft 130, which is rotatably mounted in bearings in frame 121. Driving shaft 130 may directly receive power input from shaft ends 130a, 130b, for example, by bicycle cranks in the preferred embodiment, or by other power means in other applications. Driven member or cone 136 is in point (area) contact with cone 132 along a distance substantially less than the distance between the cone ends in order to transmit torque. Cone 136 is mounted on shaft 134, which is rotatably mounted in adjustable bearing blocks 103a, 103b at opposite ends. Bearing blocks 103a, 103b slide vertically in slots 122, 124 in frame 121. Power output may be connected to the driven cone shaft at end 134a. The angle between the longitudinal axis of shaft 134 and the longitudinal axis of shaft 130 may be changed to adjust the cone contact point and the input/output cone diameters by a different arrangement than disclosed for FIGS. 1–6. Secured to bearing blocks 103a, 103b by pins 126, 128 are levers 138, 140, which are attached at their other ends to blocks 142, 144 by pins 146, 148, respectively. Rotatably secured to blocks 142, 144 by pins 146, 148 are rollers 150, 152 which roll against surface 154 of frame 121. Pilot tube 158 slides coaxially within pilot tube 156 between rollers 150 and 152. Disposed around pilot tubes 156, 158 is spring 160, which is in compression to urge rollers 150, 152 apart. Since rollers 150, 152 are in contact with surface 154 and are urged apart by spring 160, levers 138, 140 exert a downward force (as shown in FIG. 7) against shaft 134, thereby urging driven cone member 136 against driving cone member 132. This force maintains the friction boundary enabling torque to be transmitted between cones 132 and 136. The angle of shaft 134 with respect to shaft 130, and therefore the location of the contact point between the two cones, is determined by the location of rollers along surface 154.

In the embodiment depicted in FIG. 7, adjustment of the roller location is made by rotation of a screw 162 threaded through block 164 attached to block 144. As screw 162 turns, blocks 164 and 144 move to the right or left, which causes lever 140 to move block 103b and the right end of shaft 134 down or up. Since block 142 is connected to block 144 by means of tubes 156, 158 and spring 160, lever 138 will also move the left end of shaft 134 up or down in response to right or left movement of block 164. This movement causes shaft 134 to change angle with respect to shaft 130, and consequently the location of contact point (area) between cones 132 and 136 and the ratio of torque and speed transmitted between the cones will also change.

Since surface 154 is flat as shown in FIG. 7, the variation of spacing between blocks 142 and 144 can vary during rotation of screw 162 due to movement of tubes and the force of spring 160. In an alternative embodiment, tubes 156, 158 and spring 160 may be replaced by a solid connection, and flat surface 154 may be replaced by a downwardly concave curved surface, the curvature of which may be readily determined by the actual size of the components such that a friction boundary is maintained between cones 132 and 136 enabling torque to be transmitted throughout the range of angular adjustment between shafts 130 and 134. Also, in place of threaded screw 162, a push rod may be substituted to move rollers 142, 144 to the left and right.

At the far right end, screw 162 is rotatably secured in an opening 165 in frame 121 adjacent pulley 166 on the screw shaft. Threaded screw 162 may be rotated to a desired position by belt 168 turning pulley 166. Belt 168 is turned by pulley 170 on gear 172. Gear 172 is sized to fit between spaced teeth 174 and 176 on gear 178, such that when gear 172 is centered in the space in gear 178, teeth 174 and 176 are out of engagement with the corresponding sized teeth on gear 172. Gear 178 is coaxially mounted on shaft 130 of driving cone 132, and thus is always rotating as driving cone 132 is rotating. Since gear 172 is secured to shaft 180 which is rotatably secured in opening 182 in frame 121, and axially slideable therein, axial movement of shaft 180 to the right or left as shown will cause the teeth on gear 172 to engage one of opposite sets of teeth 174 or 176 on rotating gear 178. Thus, shaft 180 may be caused to rotate in one direction or the other depending on the direction of axial movement of the shaft, which in turn will cause threaded screw 162 to rotate in one direction or the other, which in turn causes the torque and speed ratio between cones 132, 136 to change as described above.

The control action of shaft 180 occurs when it is moved out of its neutral position in which gear 172 is centered and out of contact with gear 178. This provides a virtually instantaneous toggle-type control of the input/output speed and torque ratio of transmission embodiment 120 in FIG. 7. This is in contrast to the position type control provided by the control arrangement in transmission embodiment 20 in FIGS. 1–6. Either type of toggle or position control may be utilized with either transmission embodiment.

Thus, the present invention as described provides a traction transmission for continuously and infinitely varying input/output ratios of torque and speed. To vary the rotational relationship between an input shaft and an output shaft of the traction transmission there is needed only a simple low force motion of a control element of the transmission which may be actuated internally or externally transmission. The rotational relationship of the members is rapidly actuatable throughout the entire range simultaneously with the transmission of the full torque permitted by the friction interfaces. Also, the input/output ratio may be automatically changed by the transmission as a function of required output torque, and this torque function is adjustable externally to the transmission. The input/output ratio of the transmission may be changed manually external to the transmission.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. An apparatus for providing a variable torque output in response to a given torque input comprising:

a rotatable input shaft;

a driving member connected to said input shaft, said driving member being rotatable about a longitudinal axis and having a diameter near a first end greater than the diameter near a second end and an outer surface between the first and second diameters;

a driven member rotatable about a longitudinal axis and having a diameter near a first end greater than the diameter near a second end and an outer surface;

said outer surfaces of said driving member and said driven members having configurations, and said members having a relative orientation, such that the outer surface of said driving member contacts the outer surface of said driven member along a distance less than the distance between the first and second diameters of said members to permit transmission of torque therebetween, the longitudinal axes of said members being adjustable relative to one another and ends of one of said members being rotatably mounted in cams such that upon rotation of said cams the location of contact between the outer surfaces of said driving and driven members may be varied longitudinally between their first and second diameters; and a rotatable driven shaft connected to said driven member;

whereby upon input of one torque of said input shaft, torque of said driven shaft may be varied by relative adjustment of orientation of said driving and driven members to move longitudinally the location of contact between said members.

2. The apparatus of claim 1 wherein the longitudinal axes of said members are relatively angularly adjustable.

3. The apparatus of claim 1 wherein the first diameter of said driving member is oriented near the second diameter of said driven member and the second diameter of said driving member is oriented near the first diameter of said driven member.

4. The apparatus of claim 1 wherein the outer surface of each of said members is smooth between the first and second diameters and said apparatus is operable to continuously vary the rotational torque of said output shaft.

5. The apparatus of claim 1 wherein the outer surface of both of said members, between said first and second diameter, is convex in longitudinal cross section.

6. The apparatus of claim 1 wherein the outer surface of one of said members, between said first and second diameter, is convex in longitudinal cross section and the outer surface of the other of said members, between said first and second diameter, is flat in longitudinal cross section.

7. The apparatus of claim 1 wherein the outer surface of one of said members, between said first and second diameter, is convex in longitudinal cross section and the outer surface of the other of said members, between said first and second diameter, is concave in longitudinal cross section.

8. The apparatus of claim 1 wherein at least one of said driving and driven members is substantially conical.

9. The apparatus of claim 1 wherein said driving and driven members are substantially conical.

10. The apparatus of claim 1 wherein one of said driving or driven members is rotatable about the longitudinal axis of the other of said driving or driven members to vary the location of contact between the outer surfaces of said members.

11. An apparatus for providing a variable torque output in response to a given torque input comprising:

a rotatable input shaft;

a driving member connected to said input shaft, said driving member being rotatable about a longitudinal axis and having a diameter near a first end greater than the diameter near a second end and an outer surface between the first and second diameters;

a driven member rotatable about a longitudinal axis and having a diameter near a first end greater than the diameter near a second end and an outer surface;

a pair of arms, each arm having a first end rotatably secured to an end of one of said driving or driven members and a second end movable relative to a surface, the arms urging one of said driving or driven members against the other of said driving or driven members, spacing between the second ends of said arms being variable;

said outer surfaces of said driving member and said driven members having configurations, and said members having a relative orientation, such that the outer surface of said driving member contacts the outer surface of said driven member along a distance less than the distance between the first and second diameters of said members to permit transmission of torque therebetween, the longitudinal axes of said members being adjustable relative to one another such that the location of contact between the outer surfaces of said driving and driven members may be varied longitudinally between their first and second diameters; and a rotatable driven shaft connected to said driven member; whereby upon input of one torque to said input shaft, torque of said driven shaft may be varied by relative adjustment of orientation of said driving and driven members to move longitudinally the location of contact between said members.

12. The apparatus of claim 11 further including a spring for urging said second ends of said arms apart.

13. An apparatus for providing a variable torque output in response to a given torque input comprising:

a frame;

a rotatable first shaft mounted on said frame;

a first member connected to said first shaft, said first member being rotatable about a longitudinal axis and having a diameter near a first end greater than the diameter near a second end and an outer surface between the first and second diameters;

a rotatable second shaft mounted on said frame in slots permitting movement of ends of said second shaft toward and away from ends of said first shaft;

a second member connected to said first shaft, said second member being rotatable about a longitudinal axis and having a diameter near a first end greater than the diameter near a second end and an outer surface;

said outer surfaces of said first and second members having configurations, and said members having a relative orientation, such that the outer surface of said first member contacts the outer surface of said second member along a distance less than the distance between the first and second diameters of said members to permit transmission of torque therebetween, the longitudinal axes of said members being adjustable relative to one another such that the location of contact between the outer surfaces of said driving and driven members may be varied longitudinally between their first and second diameters; and whereby upon input of one torque to one of said first or second shaft, torque of the other of said first or second shaft may be varied by movement of ends of said second shaft toward and away from ends of said first shaft to move longitudinally the location of contact between said first and second members.

14. A method of varying torque output in response to a given torque input in a power transmission comprising the steps of:

a) providing a transmission having: a rotatable input shaft; a driving member connected to said input shaft, said driving member being rotatable about a longitudinal axis and having a diameter near a first end greater than the diameter near a second end and an outer surface between the first and second diameters; a driven member rotatable about a longitudinal axis and having a diameter near a first end greater than the diameter near a second end and an outer surface; said outer surfaces of said driving member and said driven members having configurations, and said members having a relative orientation, such that the outer surface of said driving member contacts the outer surface of said driven member along a distance less than the distance between the first and second diameters of said members during rotation to permit transmission of torque therebetween, the longitudinal axes of said members being adjustable relative to one another and ends of one of said members being rotatably mounted in cams such that upon rotation of said cams the location of contact between the outer surfaces of said driving and driven members may be varied longitudinally between their first and second diameters; and a rotatable driven shaft connected to said driven member;

b) positioning said driving and said driven members such that said members contact each other along their outer surfaces at a first location on said driving member and a first location on said driven member between the first and second diameters of said members;

c) applying torque to said input shaft and transmitting said torque through said driving member to said driven member and said driven shaft to achieve a first torque output;

d) rotating said cams and adjusting the orientation of said driving member relative to said driven member and repositioning contact between said members such that said members contact each other at second locations on their outer surfaces, longitudinally different from the first locations, to achieve a second torque output at said driven shaft, different from said first torque output.

15. The method of claim 14 wherein said step (d) orientation is by changing the relative angular position of said driving member relative to said driven member.

16. The method of claim 14 including the step of rotating one of said driving or driven members about the longitudinal axis of the other of said driving or driven members to vary the location of contact between the outer surfaces of said members.

17. A method of varying torque output in response to a given torque input in a power transmission comprising the steps of:

a) providing a transmission having: a rotatable input shaft; a driving member connected to said input shaft, said driving member being rotatable about a longitudinal axis and having a diameter near a first end greater than the diameter near a second end and an outer surface between the first and second diameters; a driven member rotatable about a longitudinal axis and having a diameter near a first end greater than the diameter near a second end and an outer surface; a pair of arms, each arm having a first end rotatably secured to an end of one of said driving or driven members and a second end movable relative to a surface, the arms urging one of said driving or driven members against the other of said driving or driven members, spacing between the second ends of said arms being variable; said outer surfaces of said driving member and said driven members having configurations, and said members having a relative orientation, such that the outer surface of said driving member contacts the outer surface of said driven member along a distance less than the distance between the first and second diameters of said members during rotation to permit transmission of torque therebetween, the longitudinal axes of said members being adjustable relative to one another such that the location of contact between the outer surfaces of said driving and driven members may be varied longitudinally between their first and second diameters; and a rotatable driven shaft connected to said driven member;

b) positioning said driving and said driven members such that said members contact each other along their outer surfaces at a first location on said driving member and a first location on said driven member between the first and second diameters of said members;

c) urging said second ends of said arms apart;

d) applying torque to said input shaft and transmitting said torque through said driving member to said driven member and said driven shaft to achieve a first torque output;

e) adjusting the orientation of said driving member relative to said driven member and repositioning contact between said members such that said members contact each other at second locations on their outer surfaces, longitudinally different from the first locations, to achieve a second torque output at said driven shaft, different from said first torque output.

18. The method of claim 17 wherein said second ends of said arms are urged apart in step (c) by a spring.

19. A method of varying torque output in response to a given torque input in a power transmission comprising the steps of:

a) providing a transmission having: a frame; a rotatable first shaft mounted on said frame; a first member connected to said first shaft, said first member being rotatable about a longitudinal axis and having a diameter near a first end greater than the diameter near a second end and an outer surface between the first and second diameters; a rotatable second shaft mounted on said frame in slots permitting movement of ends of said second shaft toward and away from ends of said first shaft; a second member connected to said first shaft, said second member being rotatable about a longitudinal axis and having a diameter near a first end greater than the diameter near a second end and an outer surface; said outer surfaces of said first and second members having configurations, and said members having a relative orientation, such that the outer surface of said first member contacts the outer surface of said second member along a distance less than the distance between the first and second diameters of said members to permit transmission of torque therebetween, the longitudinal axes of said members being adjustable relative to one another such that the location of contact between the outer surfaces of said driving and driven members may be varied longitudinally between their first and second diameters; and b) positioning said first and second members such that said members contact each other along their outer surfaces at a first location on said first member and a first location on said second member between the first and second diameters of said members;

d) applying torque to one of said first or second shafts and transmitting said torque through said first and second members to the other of said first or second shaft to achieve a first torque output;

e) adjusting the orientation of said first member relative to said second member by movement of ends of said second shaft toward and away from ends of said first shaft to move longitudinally the location of contact between said first and second members to achieve a second torque output at said other shaft, different from said first torque output.

* * * * *